May 26, 1936.  D. D. KNOWLES  2,042,182

OIL BATH TEMPERATURE REGULATOR

Filed May 19, 1934

WITNESSES:

INVENTOR
Dewey D. Knowles.
BY
ATTORNEY

Patented May 26, 1936

2,042,182

UNITED STATES PATENT OFFICE 2,042,182

OIL BATH TEMPERATURE REGULATOR

Dewey D. Knowles, Wilkinsburg, Pa., assignor to Westinghouse Electric & Manufacturing Company, East Pittsburgh, Pa., a corporation of Pennsylvania Application May 19, 1934, Serial No. 726,558

11 Claims. (Cl. 219—20)

The invention relates generally to temperature controlling systems and more particularly to temperature controlling systems employing electric discharge devices to control the functioning of the means for delivering heat.

It is known that electric discharge devices of certain types are sensitive to temperature changes, and if connected across a source of power, will ignite at predetermined temperatures. Further, it is known that electric discharge devices connected across alternating current power sources may be operated to interrupt the flow of current therethrough at a predetermined instant in the cycle. These characteristics of electric discharge devices may be taken advantage of in adapting them to control the delivery of heat to a bath or other object to be heated.

The object of the present invention is to utilize electric discharge devices to periodically reduce the amount of heat being delivered by a heating device by a predetermined decrement to maintain a mass or object being heated at a predetermined temperature.

For a fuller understanding of the nature and objects of the invention reference may be had to the following detailed description taken in conjunction with the accompanying drawing, in which.

Figure 1:
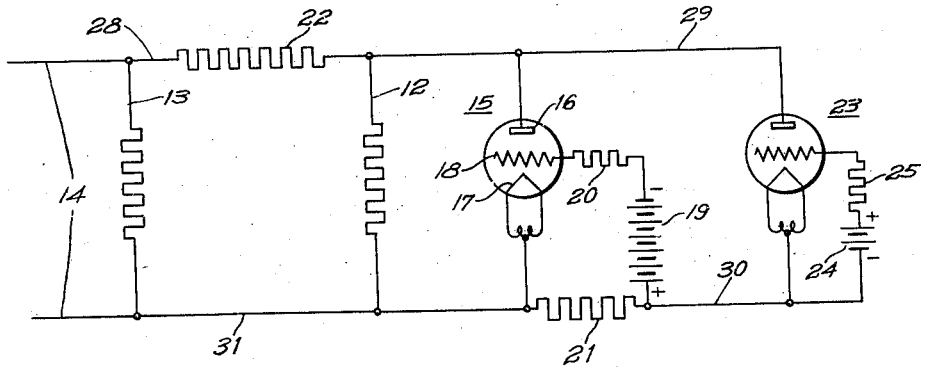
Figure 1 is a diagrammatic view of a system for controlling temperatures arranged in accordance with this invention.

In the iron and steel industries, in chemical plants, and many other places, it is required that baths of different kinds, furnaces, solutions, etc., be kept at constant or substantially constant temperatures. The present invention may be utilized in many such industries for maintaining temperatures constant.

In the present embodiment of the invention, the system is shown as applied to maintain an oil bath substantially constant. Referring to the drawing and Fig. 3 in particular, a container 10, as illustrated, is partly filled with an oil 11, and may be utilized for any purpose requiring oil at a predetermined temperature.

In this instance, an electric heater, comprising two elements, 12 and 13, are provided for heating the oil to the desired temperature. While electric heaters are illustrated, it is to be understood that other means may be employed for delivering heat to the oil bath 11.

Referring to Fig. 1, the electric heating elements 12 and 13 of the heater are connected across any suitable source of electric energy, such as the power lines 14. The element 13 is a fixed heater which will supply a predetermined amount of heat continuously, but not enough to raise the bath to the temperature required. The heating element 12 is a regulating heater which cooperates with the heating element 13 in raising the temperature of the bath, and is so designed that the two, when functioning together, will supply enough heat to raise the temperature of the bath slightly above the value required under the conditions to be met in the plant.

Ordinarily, in utilizing the oil bath for the purposes for which it is provided, a considerable amount of heat is carried away in the process practiced, and the heating elements 12 and 13 must be of sufficient capacity to raise the temperature of the oil to the required value and maintain it at that temperature irrespective of the heat losses which are caused when the bath is utilized for the purpose for which it is provided. The result is that when the bath stands idle, or is not being worked to capacity, it will accumulate heat and the temperature will be raised to a point above that desired.

In order to reduce the amount of heat delivered by the heater, including the elements 12 and 13, when the bath has reached a predetermined temperature, an electric discharge device 15 is disposed to be connected in shunt of the heating element 12. This discharge device 15 is located outside of the oil bath, and has capacity for carrying large current thereby to greatly reduce the current flowing in the element 12 and the heat delivered by it.

There are many types of tubes that may be employed in this system. In the experimental work which was carried on to show the efficiency of the system, a mercury-vapor, grid-glow tube was utilized. Tubes of this type are well known in the art and comprise an anode 16, filament or cathode 17, and a grid or control electrode 18, which may be employed for controlling the flow of current through the tube, all enclosed in a glass bulb which is coated on the inside with mercury. In grid-glow tubes of this type, the voltage at which breakdown or ignition occurs may be controlled by the voltage imposed on the control electrode 18. In this particular embodiment of the invention, in order to prevent ignition or breakdown of the tube 15 when the line potential is imposed across the anode and cathode, a battery 19 is provided for imposing a negative potential on the grid.

As illustrated, a resistor 20 is disposed between the negative terminal of the battery 19 and the grid 18. A resistor 21 of high ohmic value is disposed between the positive terminal of the battery and the cathode 17 of the tube 15.

When tubes of this type ignite or break down, a certain amount of the mercury is vaporized, and when current flows, the electrons in passing from cathode to anode ionize the gas and produce positive ions of mercury. These positive ions neutralize the negative space charge of the electrons and thereby permit the passage of large currents with a very low potential drop across the tube. Therefore, when the tube 15 is ignited, practically no current will flow in the element 12 of the heater. As shown, the resistor 22 which is preferably located outside of the oil bath is connected between the electric heating elements 12 and 13, thereby maintaining the heating element 13 active.

Figure 3:
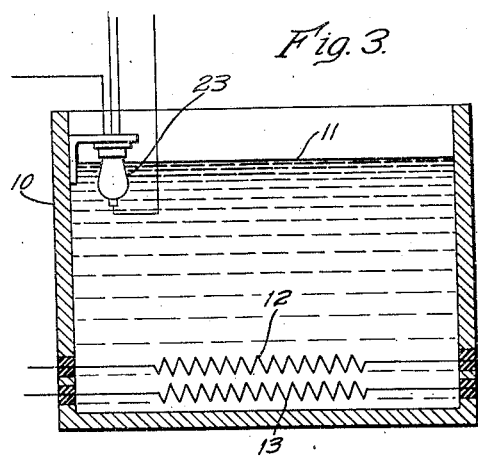
Fig. 3 is a view, partly in side elevation and partly in vertical section, showing details of the structure and apparatus employed in the system.

Tubes which function with a mercury vapor or the like are sensitive to temperature changes, and if a predetermined potential is impressed across them and the temperature is changed, they will ignite or break down, permitting current to flow. In the present system, this characteristic of such tubes is taken advantage of and a tube shown generally at 23 having the desired characteristics is immersed in the oil bath 11, as shown in Fig. 3.

The tube 23 is connected across the power source in parallel with the tube 15. In order to render the tube more sensitive, a battery 24 is connected to the control grid to impress a positive potential on it relative to the cathode. As shown a resistor 25 is connected between the positive terminal of the battery 24 and the control electrode of the tube 23. The negative terminal of the battery 24 is connected to the cathode of the tube 23.

Figure 2:
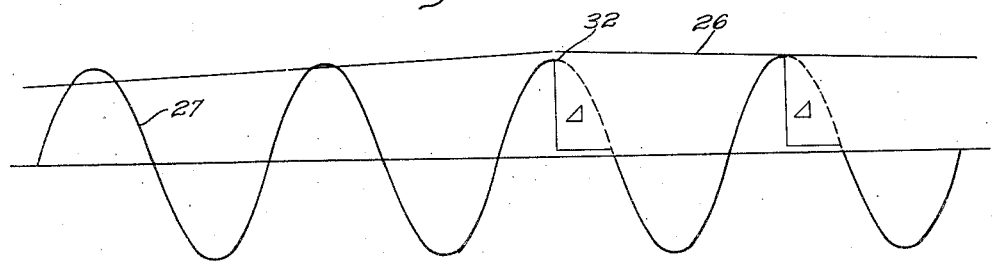
Fig. 2 is a graph illustrating the manner in which the temperature control system functions.

The operation of the apparatus will be understood by referring to Fig. 2 in which the temperature and anode potential of tube 15 are plotted as ordinates and time is plotted as abscissa. Assuming that voltage is applied to the heating elements 12 and 13, that the oil bath has been heated and that the temperature is raised to a value represented by the line 26, then when the temperature reaches a value above the predetermined requirements, the tube 23 will be ignited and current will flow. The circuit through the tube 23 will extend from the power source 14 through conductor 28, resistor 22, conductor 29, from the anode to the cathode of the tube 23, conductor 30, resistor 21 and conductor 31 back to the other terminal of the power source. The voltage drop across the resistor 21 will be high, and when it reaches a predetermined value in opposition to the voltage of the battery 19, it will change the negative potential imposed on the control electrode 18 relative to the cathode 17 by the battery 19 to a positive potential and the tube 15 will ignite.

When the conditions that are to be maintained are known, the system may be adjusted to impose a predetermined potential on the control electrode 18 relative to the cathode of the tube 15 to cause its ignition at any point in the positive half cycle of the voltage impressed across the anode and cathode. In the graph illustrated, the system was set to break down at the point 32.

When the tube 15 is ignited, the heating element 12 is shunted, since the resistance of the tube is so small that practically no current will flow in the heating element 12. Since in tubes of this type, when the current is once started the control grid has no effect in interrupting it, current will continue to flow through the tube 15 until the potential impressed across the anode and cathode has decreased to zero. In this manner, the heat delivered by the elements 12 and 13 is decreased by a predetermined decrement. If the temperature is still too high at the corresponding point 32 in the next cycle, the operation will be repeated, and if the system has been properly adjusted, the decreasing of the amount of heat delivered by this amount represented by a predetermined portion of the cycle will soon reduce the bath to the proper temperature. When the temperature is down to or below the temperature line 26, the tube 23 will not ignite under the potential of the power source, and the heating element 12 will cooperate in the heating of the bath.

In the operation of the system when the tube 15 is ignited, the tube 23 will be extinguished. The tube 23 conducts current therethrough only long enough to effect the ignition of the tube 15. However, if the temperature is still above the predetermined value for which the system is adjusted, as soon as the tube 15 is extinguished at zero voltage, current will again flow in the tube 23 and the ignition of the tube 15 will occur again at the same point in the voltage cycle.

The preferred embodiment of the invention described hereinbefore comprises a system for decreasing the amount of heat delivered to the bath by predetermined decrement when the temperature reaches or exceeds a predetermined value, thereby to gradually reduce the temperature to the value at which it is desired to maintain the bath. It will be readily appreciated from an examination of the circuit of the preferred embodiment that the functioning of the system could be reversed to periodically add increments of heat to raise the temperature of the bath when it falls below a predetermined value.

Figure 4:
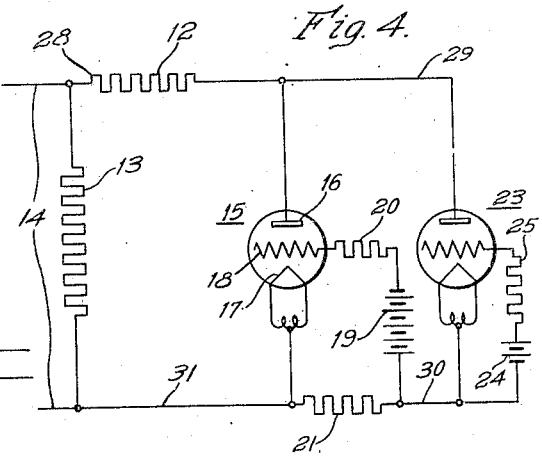
Fig. 4 is a diagrammatic view of a system which is a modification of the embodiment of the invention illustrated in Fig. 1.

Referring to Fig. 4, a system which is identical with the system disclosed in Fig. 1, with the exception that the heating element 12 is connected in series circuit relation with the electric discharge device 15 instead of in parallel circuit relation and the resistor 22 has been dispensed with. In this instance, an electric discharge device 23 will be selected which will respond when the temperature of the bath is decreased to a predetermined value.

Whether the discharge device 23 responds to an increase in temperature or a decrease in temperature depends on whether the starting gridpotential is a decreasing or an increasing function of the temperature. This in turn depends on the properties of the discharge device and the potential impressed thereon. In one commonly used discharge device, the grid has a mesh of .625 millimeters and surrounds the anode, and the electrodes are immersed in mercury vapor. When the control potential is supplied to such a device through a resistor of the order of 3000 ohms and 440 volts is impressed between the anode and cathode, the starting-grid potential is a decreasing function of the temperature. If 110 volts is impressed between the anode and cathode, an increasing function is the result.

In operation, when the temperature of the bath falls below the value at which it is desired to maintain it, the electric discharge device 23 will be ignited and in the manner described hereinbefore will effect the ignition of the electric discharge device 15. When the discharge device 15 is caused to function, current will flow through the element 12 of the electric heater which will cooperate with the element 13 in heating the bath.

As explained hereinbefore, as soon as the electric discharge 15 has been ignited, the flow of current through the electric discharge device 23 will be interrupted. Current will continue to flow through the element 12 and the electric discharge device 15 until the end of the cycle when it will be interrupted. If the increment of heat added by connecting the element 12 across the power source is sufficient to raise the temperature of the bath to the predetermined value required, the electric discharge device 23 will not be ignited during the next cycle. However, if the temperature of the bath has not been raised to the proper value, the electric discharge device 23 will be ignited at the same point in the next cycle and another increment of heat will be added to the bath. In this manner, heat will be added in predetermined increments until the temperature of the bath is raised to the required value.

The increments of heat added to the bath for each cycle may be varied by the selection of the electric discharge device 23 and the means for controlling its point of ignition in the cycle. The point of ignition is of course determined by the relationship between the anode potential and the control potential. For a given value of anode potential, there is a corresponding value of critical control potential above which the discharge device is energized and for a given value of critical control potential there is a corresponding value of anode potential. If, in a particular situation, the anode potential has a steep wave front or the critical anode potential is considerably less than the amplitude of the wave, the point of ignition is early in the half cycle. If the critical anode potential is substantially equivalent to the amplitude of the wave, the ignition will take place at the beginning of the latter half of the half cycle.

While I have herein shown a system in which an electric discharge device of the vapor filled type is utilized, other discharge devices having temperature characteristics may also be utilized. Thus, it is possible to utilize a mercury pool, grid controlled electric discharge device of the keep-alive type.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. In a system for controlling the temperature of a bath, in combination, a source of alternating current power, an electric heater connected to the source of power for delivering heat to the bath, an electric discharge device connected to the source of power and disposed to shunt a portion of the heater to control the delivery of heat to the bath, and an electric discharge device sensitive to temperatures disposed to initiate the functioning of the heat controlling discharge device whereby when the temperature reaches a predetermined value the delivery of heat is reduced for a portion of each cycle of power.

2. In a temperature control system, in combination, a bath to be heated to a predetermined temperature, an electric heating element disposed to heat the bath, a power source for the electric heating element, an electric discharge device disposed to shunt a portion of the heating element to reduce the amount of heat delivered when the heater is in operation, and an electric discharge device sensitive to temperature changes disposed to be affected by the temperature of the bath and for initiating the ignition of the heat controlling electric discharge device to decrease the amount of heat delivered during one-half of each power cycle.

3. In combination, a power source, a heating element connected to be energized by current supplied from said source, an electric discharge device having a control electrode and a plurality of principal electrodes, means for connecting said principal electrodes in shunt with said heating element, whereby when a discharge is transmitted between said principal electrodes, the current transmitted through said heating element is small, means in circuit with said control electrode for maintaining the current transmitted between said principal electrodes small, a second discharge device having a control electrode and a plurality of principal electrodes, said second discharge device being of the type in which the relationship between the excitation thereof and the potentials impressed thereon is a function of the temperature thereof, means for so connecting the principal electrodes of said second discharge device in circuit with the control electrode of said first discharge device, that when a change occurs in the condition of excitation of said second discharge device a substantial discharge is transmitted between the principal electrodes of said first discharge device, and means for supplying potentials to said second discharge device that are of such magnitude that a change in excitation occurs at a predetermined temperature.

4. In combination, a power source, a heating element connected to be energized by current supplied from said source, an electric discharge device having a plurality of principal electrodes, means for connecting said principal electrodes in shunt with said heating element, whereby when a discharge is transmitted between said principal electrodes, the current transmitted through said heating element is small, means for maintaining the current transmitted between said principal electrodes small, a second discharge device having a plurality of principal electrodes, said second discharge device being of the type in which the relationship between the excitation thereof and the potentials impressed thereon is a function of the temperature thereof, means for so connecting the principal electrodes of said second discharge device to said first discharge device, that when a change occurs in the condition of excitation of said second discharge device a discharge is transmitted between the principal electrodes of said first discharge device, and means for supplying potentials to said second discharge device that are of such magnitude that a change in excitation occurs at a predetermined temperature.

5. In combination, a power source, a heating element connected to be energized by current supplied from said source, an electric discharge device having a plurality of electrodes, means for connecting said electrodes in shunt with said heating element whereby when a discharge is transmitted between the electrodes of said discharge device the current transmitted through said heating element is small, means for maintaining said discharge device in deenergized condition, a network, comprising an impedance and a second discharge device having electrodes, connected in series with the impedance, said second discharge device being of the type in which the relationship between the potentials impressed thereon and the excitation is a function of the temperature thereof, means for connecting said network in shunt with said first discharge device, means for so coupling said means whereby said first discharge device is maintained deenergized to said network that when a change occurs in the excitation of said second discharge device a discharge is transmitted between the electrodes of said first discharge device, and means for adjusting the potentials impressed on said second discharge device to such a value that a change in the excitation occurs at a predetermined temperature.

6. In combination, a power source, a heating element connected to be energized by current supplied from said source, an electric discharge device having a plurality of electrodes, means for connecting said electrodes in shunt with said heating element whereby when a discharge is transmitted between the electrodes of said discharge device the current transmitted through said heating element is small, means for maintaining said discharge device in deenergized condition, a second heating element to be energized by current supplied from said source, means in circuit with said second element and said discharge device, for maintaining the supply of current to said second heating element regardless of the condition of said discharge device, a second discharge device having electrodes, said second discharge device being of the type in which the relationship between the potentials impressed thereon and the excitation is a function of the temperature thereof, means for so coupling said second discharge device to said first discharge device and said means whereby said first discharge device is maintained deenergized that when a change occurs in the excitation of said second discharge device, a discharge is transmitted between the electrodes of said first discharge device, and means for adjusting the potentials impressed on said second discharge device to such a value that a change in the excitation occurs at a predetermined temperature.

7. In combination, a power source, a network comprising a heating element and an electric discharge device having a plurality of electrodes connected in series with said heating element, means for connecting said network to said power source in such manner that when a discharge passes between the electrodes of said discharge device current is supplied to said heating element, means for maintaining said discharge device in deenergized condition, a second discharge device having electrodes, said second discharge device being of the type in which the relationship between the excitation and the potentials impressed between the electrodes is a function of the temperature thereof, means for so coupling said second discharge device to said first discharge device and said means whereby said first discharge device is maintained deenergized that when a change occurs in the excitation of said second discharge device said first discharge device is energized and a discharge is transmitted between the electrodes thereof and means for maintaining the potential impressed between the electrodes of said second discharge device at such a value that a change in the excitation of said discharge device occurs at a predetermined temperature.

8. In combination, a power source, a network comprising a heating element and an electric discharge device having a plurality of electrodes connected in series with said heating element, means for connecting said network to said power source in such manner that when a discharge passes between the electrodes of said discharge device current is supplied to said heating element, means for maintaining said discharge device in deenergized condition, a second heating element supplied by said power source in shunt with said network, a second discharge device having electrodes, said second discharge device being of the type in which the relationship between the excitation and the potentials impressed between the electrodes is a function of the temperature thereof, means for so coupling said second discharge device to said first discharge device and said means whereby said first discharge device is maintained deenergized that when a change occurs in the excitation of said second discharge device said first discharge device is energized and a discharge is transmitted between the electrodes thereof and means for maintaining the potential impressed between the electrodes of said second discharge device at such a value that a change in the excitation of said discharge device occurs at a predetermined temperature.

9. In combination, a power source, a heating element connected to be energized by current supplied from said source, an electric discharge device having a plurality of principal electrodes, said principal electrodes being immersed in a gaseous medium, means for connecting said principal electrodes in shunt with said heating element, whereby when a discharge is transmitted between said principal electrodes, the current transmitted through said heating element is small, means for maintaining the current transmitted between said principal electrodes small, a second discharge device having a plurality of principal electrodes, said second discharge device being of the type in which the relationship between the excitation thereof and the potentials impressed thereon is a function of the temperature thereof, means for so connecting the principal electrodes of said second discharge device in circuit with said first discharge device, that when a change occurs in the condition of excitation of said second discharge device a discharge is transmitted between the principal electrodes of said first discharge device and means for supplying potentials to said second discharge device that are of such magnitude that a change in excitation occurs at a predetermined temperature.

10. In combination, a power source, a heating element connected to be energized by current supplied from said source, an electric discharge device having a plurality of principal electrodes, and a control electrode, means for connecting said principal electrodes in shunt with said heating element, whereby when a discharge is transmitted between said principal electrodes, the current transmitted through said heating element is small, means in circuit with said control electrode for maintaining the current transmitted between said principal electrodes small, a second discharge device having a plurality of principal electrodes immersed in a highly evacuated envelope and a quantity of liquid mercury disposed within said envelope, means for so connecting the principal electrodes of said second discharge device in circuit with said first discharge device, that when a change occurs in the condition of excitation of said second discharge device a discharge is transmitted between the principal electrodes of said first discharge device and means for supplying potentials to said second discharge device that are of such magnitude that a change in excitation occurs at a predetermined temperature.

11. Apparatus according to claim 10, in which the electrodes of the first discharge device are immersed in a gaseous medium.

DEWEY D. KNOWLES.